(12) United States Patent
Tamaki et al.

(10) Patent No.: US 11,868,135 B2
(45) Date of Patent: Jan. 9, 2024

(54) PROCESSING DEVICE, PROCESSING METHOD, AND MEDIUM FOR EVALUATING MAP RELIABILITY FOR VEHICLES

(71) Applicant: HONDA MOTOR CO., LTD., Tokyo (JP)

(72) Inventors: Takeshi Tamaki, Wako (JP); Takahiro Yoshida, Wako (JP); Marina Saikyo, Wako (JP); Akinori Oi, Wako (JP); Yoshimitsu Murahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 191 days.

(21) Appl. No.: 17/364,928

(22) Filed: Jul. 1, 2021

(65) Prior Publication Data

US 2022/0004193 A1 Jan. 6, 2022

(30) Foreign Application Priority Data

Jul. 6, 2020 (JP) .................................. 2020-116374

(51) Int. Cl.
*G05D 1/02* (2020.01)
*G05D 1/00* (2006.01)
(Continued)

(52) U.S. Cl.
CPC ......... *G05D 1/0214* (2013.01); *G05D 1/0088* (2013.01); *G05D 1/0223* (2013.01); *G06V 20/58* (2022.01); *G06V 20/588* (2022.01)

(58) Field of Classification Search
CPC .. G05D 1/0214; G05D 1/0088; G05D 1/0223; G05D 1/0274; G05D 2201/0213; G06V 20/58; G06V 20/588; G01B 11/002
See application file for complete search history.

(56) References Cited

U.S. PATENT DOCUMENTS

2009/0076774 A1* 3/2009 Miyajima ............ G08G 1/0104
702/179
2017/0122749 A1 5/2017 Urano et al.
(Continued)

FOREIGN PATENT DOCUMENTS

CN 106996793 8/2017
CN 107203192 9/2017
(Continued)

OTHER PUBLICATIONS

Japanese Office Action for Japanese Patent Application No. 2020-116374 dated Jun. 7, 2022.
(Continued)

*Primary Examiner* — Aniss Chad
*Assistant Examiner* — Nikki Marie M Molina
(74) *Attorney, Agent, or Firm* — Amin, Turocy & Watson, LLP

(57) ABSTRACT

A processing device acquires map data that has road information, acquires detection results detected by one or more detectors that detects surroundings of a first mobile object, and cross-checks a position of a second mobile object included in the detection results with the road information of the map data to determine whether or not the position of the second mobile object is included in a region indicating a road of the road information.

12 Claims, 12 Drawing Sheets

(51) Int. Cl.
  *G06V 20/58*  (2022.01)
  *G06V 20/56*  (2022.01)

(56) References Cited

U.S. PATENT DOCUMENTS

| | | |
|---|---|---|
| 2019/0235499 A1* | 8/2019 | Kazemi ................. G01S 17/931 |
| 2019/0258249 A1* | 8/2019 | Kim ................... G01C 21/3837 |
| 2019/0258269 A1 | 8/2019 | Yanagihara et al. |
| 2019/0286149 A1 | 9/2019 | Miura et al. |
| 2020/0090347 A1 | 3/2020 | Ozasa et al. |
| 2020/0098126 A1* | 3/2020 | Ozawa ................. G01S 13/931 |
| 2021/0223789 A1 | 7/2021 | Chen et al. |

FOREIGN PATENT DOCUMENTS

| | | |
|---|---|---|
| CN | 110171420 | 8/2019 |
| CN | 110275521 | 9/2019 |
| CN | 111274343 | 6/2020 |
| EP | 4067190 A1 * | 10/2022 |
| JP | 2011-027595 | 2/2011 |
| JP | 2019-197356 | 11/2019 |
| JP | 2020-001668 | 1/2020 |
| JP | 2020-060550 | 4/2020 |
| WO | 2010/095236 | 8/2010 |

OTHER PUBLICATIONS

Chinese Office Action for Chinese Patent Application No. 202110669329.7 dated Aug. 10, 2023.

* cited by examiner

FIG. 9

| AUTOMATED DRIVING MODE | SURROUNDINGS MONITORING | HANDS-ON |
|---|---|---|
| FIRST MODE | REQUIRED | NOT REQUIRED |
| SECOND MODE | REQUIRED | REQUIRED |

FIG. 10

| AUTOMATED DRIVING MODE | SURROUNDINGS MONITORING | HANDS-ON |
|---|---|---|
| FIRST MODE | NOT REQUIRED | NOT REQUIRED |
| SECOND MODE | REQUIRED | NOT REQUIRED |

FIG. 11

| AUTOMATED DRIVING MODE | FIRST DETERMINATION PROCESS | SECOND DETERMINATION PROCESS |
|---|---|---|
| CONDITION OF START OF FIRST MODE | POSITIVE | POSITIVE (OR NOT CONSIDERED) |
| CONDITION OF END OF FIRST MODE | | NEGATIVE |
| CONDITION OF START OF SECOND MODE | POSITIVE (OR NOT CONSIDERED) | |

PROCESSING DEVICE, PROCESSING METHOD, AND MEDIUM FOR EVALUATING MAP RELIABILITY FOR VEHICLES

CROSS-REFERENCE TO RELATED APPLICATION

Priority is claimed on Japanese Patent Application No. 2020-116374, filed Jul. 6, 2020, the content of which is incorporated herein by reference.

BACKGROUND

Field

The present disclosure relates to a processing device, a processing method, and a medium.

Description of Related Art

In the related art, a system adapted to compare results of measuring terrestrial features with a laser scanner with terrestrial feature data of map data and determine whether or not there are errors in the map data on the basis of the comparison result has been disclosed (Japanese Unexamined Patent Application, First Publication No. 2011-27595).

SUMMARY

However, there are cases in which it is not possible to precisely evaluate the reliability of map data in the related art.

The disclosure was made in consideration of such a circumstance, and one of objects thereof is to more precisely evaluate the reliability of map data.

A processing device, a processing method, and a medium according to the disclosure employ the following configurations.

(1) According to an aspect of the disclosure, a processing device is provided, including: a memory that stores instructions, and one or more processors that execute the instructions to: acquire map data that has road information, acquire detection results detected by one or more detector that detects surroundings of a first mobile object, and cross-check a position of a second mobile object included in the detection results with the road information of the map data to determine whether or not the position of the second mobile object is included in a region indicating a road of the road information.

(2) In the aforementioned aspect (1), the hardware processors determine whether or not a chronological trajectory of the position of the second mobile object is included in the region indicating the road and follows a shape of the road.

(3) In the aforementioned aspect (1), the second mobile object is a mobile object that is moving toward the first mobile object in a direction opposite to a traveling direction of the first mobile object.

(4) In the aforementioned aspect (1), the hardware processors control a speed and steering of the first mobile object to perform automated driving, continue first mode automated driving in a case in which it is determined that the position of the second mobile object is included in the region indicating the road of the road information when the first mode automated driving is performed, and do not continue the first mode automated driving in a case in which it is determined that the position of the second mobile object is not included in the region indicating the road of the road information when the first mode automated driving is performed.

(5) In the aforementioned aspect (4), the hardware processors perform second mode automated driving in a case in which it is determined that the position of the second mobile object is not included in the region indicating the road of the road information when the first mode automated driving is performed, and the second mode automated driving is automated driving in a mode in which a rate of automation of the automated driving is lower than a rate of automation of the first mode automated driving or a degree of surroundings monitoring required to a driver of the first mobile object is higher than a degree of surroundings monitoring as compared with a case in which the first mode automated driving is performed.

(6) In the aforementioned aspect (4), the hardware processors stop the process of determining whether or not the position of the second mobile object is included in the region indicating the road of the road information in a case in which it is determined that the position of the second mobile object is not included in the region indicating the road of the road information when the first mode automated driving is performed, and restart the determination at a predetermined timing after the determination is stopped.

(7) In the aforementioned aspect (1), the hardware processors further determine whether or not a position of a road marker line included in the detection results conforms to a position of a road marker line included in the road information.

(8) In the aforementioned aspect (7), the hardware processors control a speed and steering of the first mobile object to perform automated driving, and start first mode automated driving in a case in which a condition (1) of conditions (1) and (2) below is satisfied or conditions (1) and (2) are satisfied, the condition (1) being that a position of a road marker line included in the road information conforms to a position of a road marker line included in the detection result, and the condition (2) being that the position of the second mobile object included in the detection results is included in the region indicating the road of the road information.

(9) In the aforementioned aspect (1), the hardware processors control a speed and steering of the first mobile object to perform automated driving, and stop first mode automated driving or shift from the first mode automated driving to second mode automated driving in a case in which a condition (3) below is satisfied when the first mode automated driving is performed, the condition (3) being that the position of the second mobile object included in the detection results is not included in the region indicating the road of the road information, and the second mode automated driving being automated driving in a mode in which a rate of automation of the automated driving is lower than a rate of automation of the first mode automated driving or a degree of surroundings monitoring required to a driver of the first mobile object is higher than a degree of surroundings monitoring as compared with a case in which the first mode automated driving is performed.

(10) In the aforementioned aspect (1), the hardware processors control a speed and steering of the first mobile object on the basis of a result of determining whether or not the position of the second mobile object is included in the region indicating the road of the road information to perform automated driving.

(11) According to an aspect of the disclosure, a processing method is provided, including, by a computer: acquiring map data that has road information; acquiring detection results detected by one or more detectors that detects surroundings of a first mobile object; and cross-checking a position of a second mobile object included in the detection results with the road information of the map data and determining whether or not the position of the second mobile object is included in a region indicating a road of the road information.

(12) According to an aspect of the disclosure, a medium is provided that stores a program that causes a computer to: acquire map data that has road information; acquire detection results detected by one or more detectors that detects surroundings of a first mobile object; and cross-check a position of a second mobile object included in the detection results with the road information of the map data to determine whether or not the position of the second mobile object is included in a region indicating a road of the road information.

According to (1) to (12), the processing device can more precisely evaluate the reliability of map data by determining whether or not the position of the second mobile object is included in the region indicating the road of the road information. For example, the processing device can evaluate the reliability of map data of a road at a distant location since the determination is performed using the position of the second mobile object.

According to (2), the processing device can more precisely evaluate the reliability of map data since determination is performed using the chronological trajectory of the position of the second mobile object.

According to (3), the processing device can detect the second mobile object at a distant location by setting a mobile object offset relative to the first mobile object as the second mobile object. The processing device can thus perform the determination process at an earlier stage and evaluate the reliability of map data of a road at a further location.

BRIEF DESCRIPTION OF THE DRAWINGS

FIG. 9 is a diagram explaining an example of first mode automated driving and second mode automated driving.

FIG. 10 is a diagram explaining another example of the first mode automated driving and the second mode automated driving.

FIG. 11 is a diagram explaining a relationship between a start or an end of an automated driving mode and a result of the determination process.

FIG. 14 is a diagram for explaining an example in which automated driving modes are switched between.

DETAILED DESCRIPTION

Hereinafter, an embodiment of a processing device, a processing method, and a medium of the disclosure will be described with reference to the drawings.

First Embodiment

[Overall Configuration]

Figure 1:
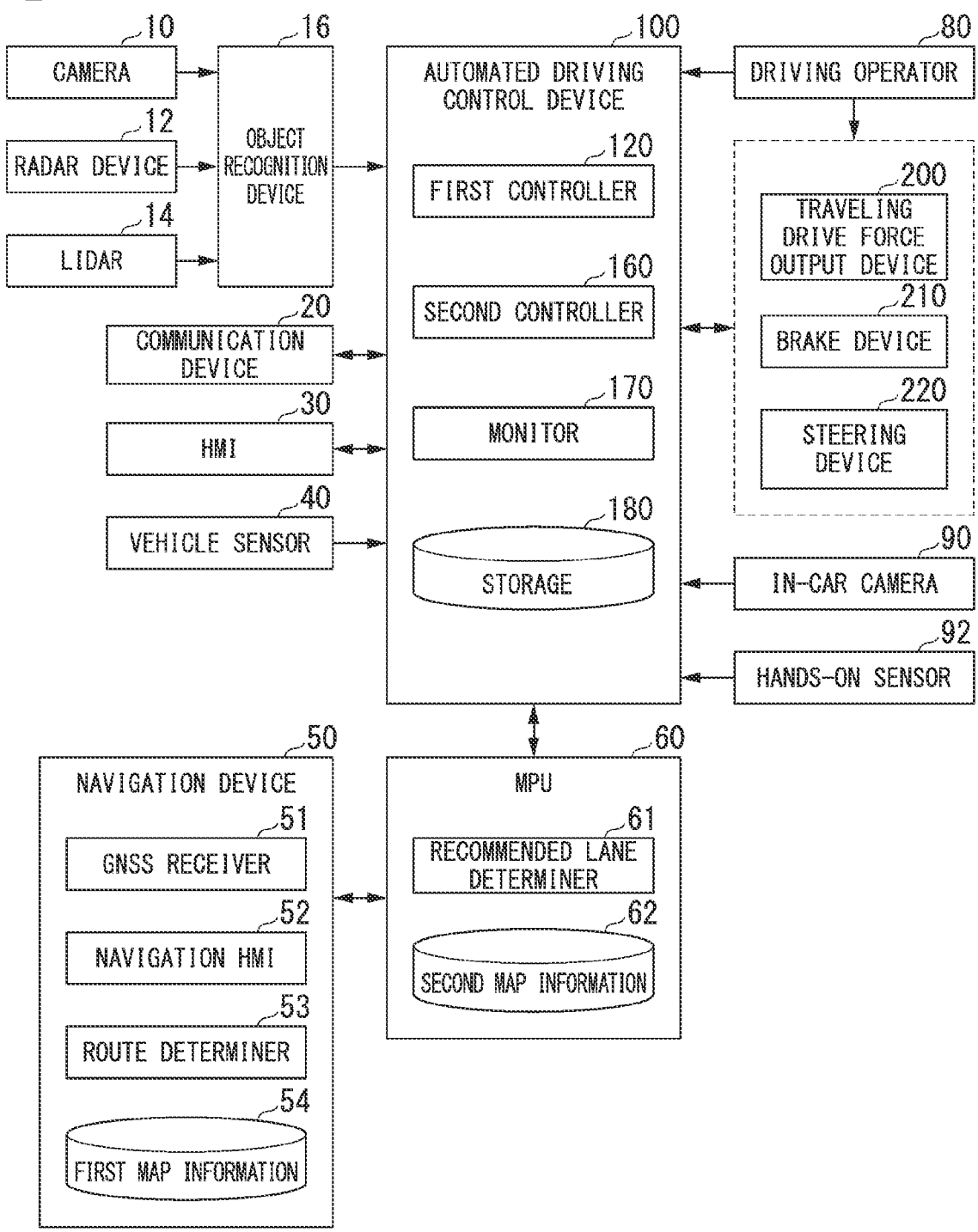
FIG. 1 is a configuration diagram of a control system using a processing device according to an embodiment.

FIG. 1 is a configuration diagram of a control system 1 using a processing device according to an embodiment. The control system 1 is mounted in a mobile object. In the following description, the mobile object is assumed to be a vehicle in one example. The vehicle is, for example, a two-wheeled, three-wheeled, or four-wheeled vehicle or the like, and a drive source thereof is an internal combustion engine such as a diesel engine or a gasoline engine, an electric motor, or a combination thereof. The electric motor operates using power generated by a generator coupled to the internal combustion engine or power discharged from a secondary battery or a fuel cell.

The control system 1 includes, for example, a camera 10, a radar device 12, a light detection and ranging (LIDAR) device 14, an object recognition device 16, a communication device 20, a human machine interface (HMI) 30, a vehicle sensor 40, a navigation device 50, a map-positioning unit (MPU) 60, a driving operator 80, an in-car camera 90, a hands-on sensor 92, an automated driving control device 100, a traveling drive force output device 200, a brake device 210, and a steering device 220. These devices and equipment are connected to each other via a multiplex communication line such as a controller area network (CAN) communication line, a serial communication line, a wireless communication network, or the like. The configuration shown in FIG. 1 is just an example, and a part of the configuration may be omitted, or other components may also be added.

The camera 10 is, for example, a digital camera using a solid imaging device such as a charge-coupled device (CCD) or a complementary-metal-oxide semiconductor (CMOS). The camera 10 is attached at an arbitrary location on a vehicle with the control system 1 mounted therein (hereinafter, referred to as a vehicle M). In a case in which a side in front is imaged, the camera 10 is attached to an upper portion of a front windshield, a rear surface of a rear-view mirror, or the like. The camera 10 periodically and repeatedly images the surroundings of the vehicle M, for example. The camera 10 may be a stereo camera.

The radar device 12 emits electromagnetic waves such as millimeter waves to the surroundings of the vehicle M, detects the electromagnetic waves (reflected waves) reflected by objects, and detects at least positions of the objects (distances and azimuth directions). The radar device 12 is attached to an arbitrary location of the vehicle M. The radar device 12 may detect positions and speeds of objects by a frequency-modulated continuous wave (FM-CW) scheme.

The LIDAR 14 emits light (or electromagnetic waves with a wavelength close to that of light) to the surroundings of the vehicle M and measures scattered light. The LIDAR 14 detects a distance to a target on the basis of a time from light emission to light reception. The emitted light is, for example, pulse-form laser light. The LIDAR 14 is attached to an arbitrary location of the vehicle M.

The object recognition device 16 performs a sensor fusion process on detection results obtained by some or all of the camera 10, the radar device 12, and the LIDAR 14 and recognizes positions, types, speeds, and the like of objects. The object recognition device 16 outputs the recognition result to the automated driving control device 100. The object recognition device 16 may output the detection results of the camera 10, the radar device 12, and the LIDAR 14 as they are to the automated driving control device 100. The object recognition device 16 may be omitted from the control system 1.

The communication device 20 communicates with other vehicles that are present in the surroundings of the vehicle M using, for example, a cellular network, a Wi-Fi network, Bluetooth (registered trademark), dedicated short-range communication (DSRC), or the like or communicates with various server devices via a wireless base station.

The HMI 30 presents various kinds of information to passengers of the vehicle M and receives an input operation from the passengers. The HMI 30 includes various display devices, a speaker, a buzzer, a touch panel, a switch, a key, or the like.

The vehicle sensor 40 includes a vehicle speed sensor that detects the speed of the vehicle M, an acceleration sensor that detects an acceleration, a yaw rate sensor that detects an angular speed around a vertical axis, an azimuth direction sensor that detects an orientation of the vehicle M, and the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies the position of the vehicle M on the basis of signals received from GNSS satellites. The position of the vehicle M may be specified or corrected with an inertial navigation system (INS) using outputs from the vehicle sensor 40. The navigation HMI 52 includes a display device, a speaker, a touch panel, a key, and the like. A part or the entirety of the navigation HMI 52 may be commonly used as the aforementioned HMI 30. The route determiner 53 determines a route from the position of the vehicle M specified by the GNSS receiver 51 (or an arbitrary input position) to a destination input by a passenger using the navigation HMI 52 (hereinafter, a route on a map) with reference to the first map information 54, for example. The first map information 54 is information in which road shapes are expressed by links representing roads and nodes connected by the links, for example. The first map information 54 may include road curvatures, point-of-interest (POI) information, and the like. The route on the map is output to the MPU 60. The navigation device 50 may perform route guidance using the navigation HMI 52 on the basis of the route on the map. The navigation device 50 may be realized by a function of a terminal device, such as a smartphone or a tablet terminal, owned by the passenger, for example. The navigation device 50 may transmit a current position and a destination to a navigation server via the communication device 20 and acquire a route equivalent to the route on the map from the navigation server.

The MPU 60 includes, for example, a recommended lane determiner 61 and holds second map information 62 in a storage device such as an HDD or a flash memory. The recommended lane determiner 61 divides the route on the map provided from the navigation device 50 into a plurality of blocks (divides the route on the map at every 100 [m] in a vehicle traveling direction, for example) and determines a recommended lane for each block with reference to the second map information 62. The recommended lane determiner 61 determines the order of the lane from the left the vehicle is to travel on. In a case in which there is a branching location in the route on the map, the recommended lane determiner 61 determines the recommended lane such that the vehicle M can travel through a reasonable route to travel on the route after the branch.

The second map information 62 is map information with higher precision than that of the first map information 54. The second map information 62 includes, for example, information regarding centers of lanes, information regarding boundaries of lanes, and the like. The second map information 62 may include road information, traffic regulation information, address information (addresses and postal codes), facility information, telephone number information, and the like. The second map information 62 may be updated as needed by the communication device 20 communicating with other devices.

The driving operator 80 includes, for example, an accelerator pedal, a brake pedal, a shift lever, a steering wheel, a variant steering, a joystick, and other operators. A sensor that detects the operation amount or whether or not an operation has been performed is attached to the driving operator 80, and the detection result is output to the automated driving control device 100 or some or all of the traveling drive force output device 200, the brake device 210, and the steering device 220.

The in-car camera 90 images passengers who are seated on seats placed inside the vehicle (particularly, a passenger who is seated in a driver's seat), for example. The in-car camera 90 is a digital camera using a solid imaging device such as a CCD or a CMOS. The in-car camera 90 periodically images the passengers, for example.

The hands-on sensor 92 is a sensor that detects a steering wheel gripping state of the driver. The gripping state is a state in which the driver of the vehicle M is gripping, holding, and operating the steering wheel or a state in which the driver has put his/her hands on the steering wheel (hand-on). The hands-on sensor 92 is an electrostatic capacitive sensor provided to follow the circumferential direction of the steering wheel 82, for example. The hands-on sensor 92 detects approach or contact of an object (hands of the driver) with respect to a region that is a target of detection as a change in electrostatic capacitance. In a case in which the electrostatic capacity is equal to or greater than a threshold value, the hands-on sensor 92 outputs a predetermined detection signal to the monitor 170. In the present embodiment, the hands-on sensor 92 detects that the driver has put his/her hands on the steering wheel, for example.

The automated driving control device 100 includes, for example, a first controller 120, a second controller 160, a monitor 170, and a storage 180. Each of the first controller 120, the second controller 160, and the monitor 170 is realized by a hardware processor such as a central processing unit (CPU) executing a program (software), for example. Some or all of these components may be realized by hardware (circuit section; including a circuitry) such as a large-scale integration (LSI), an application-specific integrated circuit (ASIC), a field-programmable gate array (FPGA), or a graphics-processing unit (GPU) or may be realized by cooperation of software and hardware. The program may be stored in a storage device (a storage device including a non-transitory storage medium) such as an HDD or a flash memory in the automated driving control device 100 in advance or may be installed in the HDD or the flash memory in the automated driving control device 100 by being stored in a detachable medium such as a DVD or a CD-ROM and by the medium (non-transitory storage medium) being attached to a drive device. The automated driving control device 100 is an example of the "processing device".

The storage 180 is realized by an HDD, a flash memory, an electrically erasable programmable read only-memory (EEPROM), a read-only memory (ROM), or a random-access memory (RAM), for example. The storage 180 stores, for example, a program and the like that are to be executed by the automated driving control device 100.

Figure 2:
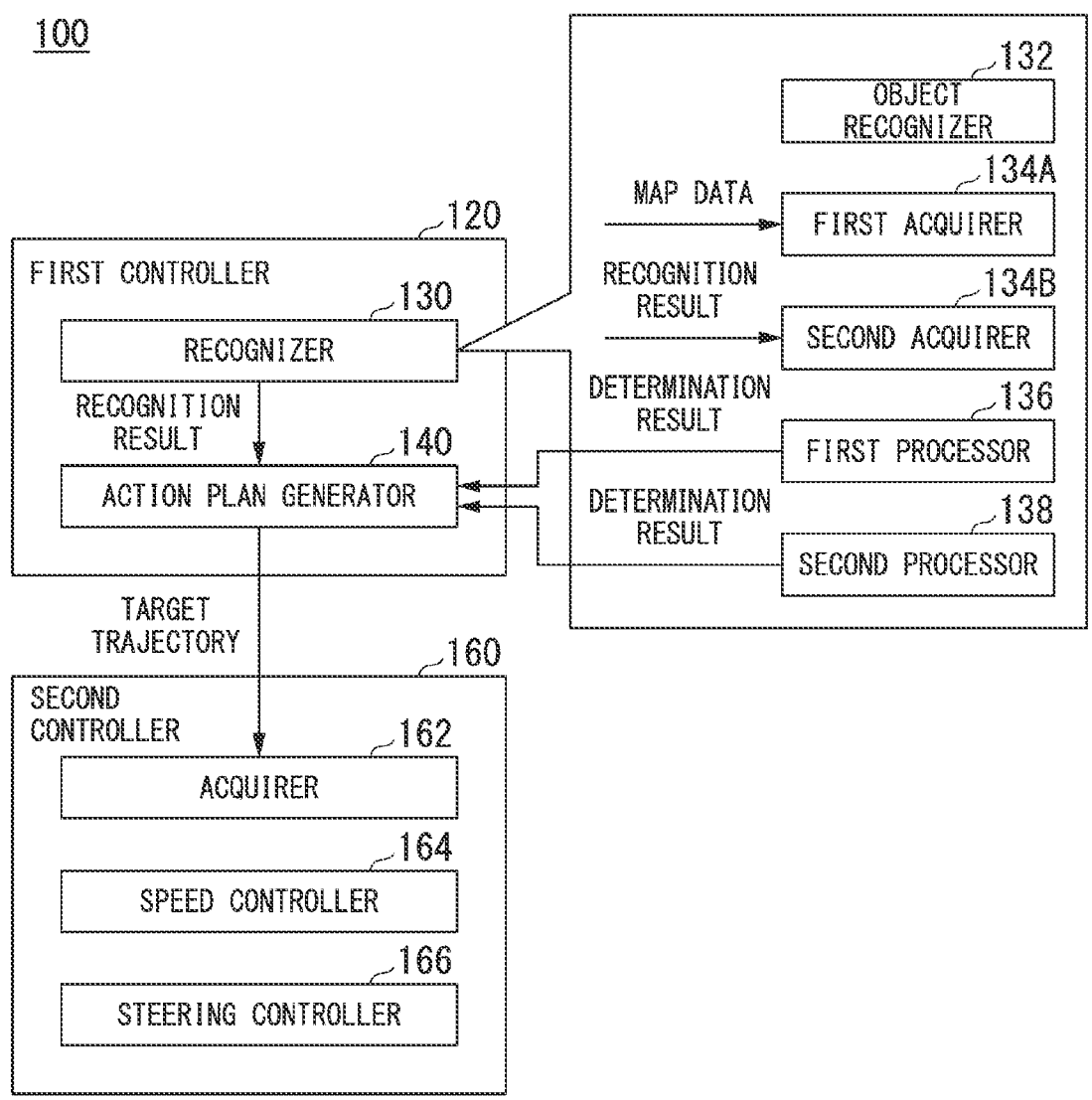
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 realizes a function based on artificial intelligence (AI) and a function based on a model given in advance in parallel, for example. For example, a function of "recognizing a traffic intersection" may be realized by executing recognition of the traffic intersection through deep learning or the like and recognition based on conditions (there are pattern-matchable signals, road signs, and the like) given in advance in parallel, scoring both recognition results, and comprehensively evaluating the scores. In this manner, the reliability of automated driving is secured.

The recognizer 130 includes, for example, an object recognizer 132, a first acquirer 134A, a second acquirer 134B, a first processor 136, and a second processor 138. The recognizer 130 is an example of the "processing device".

The object recognizer 132 recognizes types, positions, speeds, accelerations, and the like of objects that are present in the surroundings of the vehicle M on the basis of information input from the camera 10, the radar device 12, and the LIDAR 14 via the object recognition device 16. The types of the objects are types indicating whether the objects are vehicles, passengers, or the like, for example. The positions of the objects are recognized as positions in an absolute coordinate system with a representative point (a center of gravity, a drive axis center, or the like) of the vehicle M as an origin (hereinafter, a vehicle coordinate system), for example, and are used for control. The positions of the objects may be represented by representative points, such as centers of gravity or corners, of the objects or may be represented by representative regions. The "states" of the objects may include accelerations or jerks of the objects or "action states" (for example, whether or not the vehicles are changing or trying to change lanes).

The first acquirer 134A acquires map data that has road information. The road information is, for example, positions of road marker lines, types of road sectioning lines, positions of lanes, widths of lanes, and the like. The map data may be any map data as long as the map data includes the road information. The second map information 62 is an example of the "map data".

The second acquirer 134B acquires detection results detected by one or more detectors adapted to detect surroundings of the vehicle M (first mobile object). The camera 10, the radar device 12, and the LIDAR 14 are examples of the "detectors". The detectors may be the communication device 20. In this case, the communication device 20 communicates with a server device, which is not shown, and other vehicles in the surroundings to acquire information regarding the positions of objects in the surroundings of the vehicle M, the positions of other vehicles, and road sectioning lines.

The second acquirer 134B acquires the position of the vehicle M identified by the vehicle sensor 40 or the navigation device 50.

The first processor 136 cross-checks the position of the vehicle M itself specified by the navigation device 50, an image captured by the camera 10, an output from an azimuth direction sensor included in the vehicle sensor 40, and the like with the second map information 62 and recognizes which road and which lane in the map the vehicle M is traveling through. Further, the first processor 136 recognizes at which position the representative point of the vehicle M is located in the width direction of the lane (hereinafter, a lateral position) on the basis of the aforementioned various kinds of information. The lateral position may be derived as an offset amount from any one of left and right road marker lines of the lane or may be derived as an offset amount from the center of the lane. The first processor 136 recognizes by what degree the traveling direction of the vehicle M itself at that timing is inclined with respect to the extending direction of the lane (hereinafter, a yaw angle) on the basis of the aforementioned various kinds of information. In a case in which the position of the vehicle M specified by the navigation device 50, the image captured by the camera 10, the output from the azimuth direction sensor included in the vehicle sensor 40, and the like do not conform to the second map information 62 to a sufficient reliability level as a result of cross-checking them, the first processor 136 outputs information indicating a cross-checking failure to the action plan generator 140. The "cross-checking failure" also includes a case in which there is no map corresponding to the position of the vehicle M specified by the navigation device 50 and a case in which no road marker lines have been detected. As described above, the position where the vehicle M is present on the map is recognized. Hereinafter, the process of the first processor 136 cross-checking the position of the vehicle M specified by the navigation device 50, the image captured by the camera 10, the output from the azimuth direction sensor included in the vehicle sensor 40, and the like with the second map information 62 will be referred to as a "cross-checking process".

Further, the first processor 136 determines whether or not the position of a road marker line included in the detection result (the image captured by the camera 10, for example) acquired by the second acquirer 134B conforms to the position of a road marker line included in the map data. Hereinafter, the process performed by the first processor 136 may be referred to as a "first determination process".

The second processor 138 cross-checks the positions of other vehicles included in the detection result (the detection result of the LIDAR 14, for example) acquired by the second acquirer 134B with the road information of the map data and determines whether or not the position of a second mobile object is included in a region indicating a road of the road information. Hereinafter, the process performed by the second processor 138 may be referred to as a "second determination process". In a case in which the first determination process and the second determination process are not distinguished, these may be referred to as a "determination process". Details of the determination process will be described later.

The action plan generator 140 generates a target trajectory through which the vehicle M is to automatically travel in the future (without depending on driver's operations) such that the vehicle M travels through a recommended lane determined by the recommended lane determiner 61 in principle and further addresses the surrounding situation of the vehicle M. The target trajectory includes, for example, speed elements. For example, the target trajectory is expressed as points (trajectory points) where the vehicle M is to arrive aligned in order. The trajectory points are points where the vehicle M is to arrive at a predetermined traveling distance (about several [m], for example) as a distance along the road, and separately, a target speed and a target acceleration for each predetermined sampling time (about several tenths of [sec], for example) are generated as parts of the target trajectory. The trajectory points may be positions where the vehicle M is to arrive at a sampling clock time at every predetermined sampling time. In this case, information regarding the target speeds and the target accelerations is expressed by intervals of the trajectory points.

The action plan generator 140 may set automated driving events when the target trajectory is generated. The automated driving events may include a constant speed traveling event, a low speed following traveling event, a lane changing event, a branching event, a merging event, a takeover event, and the like. The action plan generator 140 generates the target trajectory in accordance with activated events.

The action plan generator 140 controls the vehicle M on the basis of a result of the determination process and a monitoring result of the monitor 170. Details of the control will be described later.

The second controller 160 controls the traveling drive force output device 200, the brake device 210, and the steering device 220 such that the vehicle M passes through the target trajectory generated by the action plan generator 140 at a scheduled clock time.

The second controller 160 includes, for example, an acquirer 162, a speed controller 164, and a steering controller 166. The acquirer 162 acquires information regarding the target trajectory (trajectory points) generated by the action plan generator 140 and causes a memory (not shown) to store the information. The speed controller 164 controls the traveling drive force output device 200 or the brake device 210 on the basis of the speed elements accompanying the target trajectory stored in the memory. The steering controller 166 controls the steering device 220 in accordance with a degree of curving of the target trajectory stored in the memory. The processes of the speed controller 164 and the steering controller 166 are realized by a combination of feed-forward control and feed-back control, for example. In one example, the steering controller 166 executes the feed-forward control in accordance with a curvature of the road in front of the vehicle M and the feed-back control based on separation from the target trajectory in combination.

The monitor 170 determines whether or not the driver who is seated in the driver's seat of the vehicle M is monitoring the surroundings of the vehicle M on the basis of the image captured by the in-car camera 90. The monitor 170 extracts a face image of the passenger who is seated in the driver's seat from the image and acquires a sight direction from the extracted face image, for example. For example, the monitor 170 may acquire the sight direction of the passenger from the image through deep learning using a neural network or the like. A neural network that has been caused to learn to output a sight direction when a face image is input is constructed in advance, for example. The monitor 170 acquires the sight direction of the passenger by inputting the face image of the passenger of the vehicle M to the neural network. The monitor 170 determines whether or not the passenger is monitoring the surroundings of the vehicle M itself on the basis of whether or not the sight direction of the passenger obtained from the image is included in a range of a monitoring target determined in advance.

Returning to FIG. 1, the traveling drive force output device 200 outputs a traveling drive force (torque) for the vehicle traveling to drive wheels. The traveling drive force output device 200 includes, for example, a combination of an internal combustion engine, an electric motor, a transmission, and the like and an electronic control unit (ECU) that controls them. The ECU controls the aforementioned configurations in accordance with information input from the second controller 160 or information input from the driving operator 80.

The brake device 210 includes, for example, a brake caliper, a cylinder that transmits an oil pressure to the brake caliper, an electric motor that generates the oil pressure in the cylinder, and a brake ECU. The brake ECU controls the electric motor in accordance with information input from the second controller 160 or information input from the driving operator 80 to output a brake torque in accordance with a control operation to each wheel. The brake device 210 may include, as a back-up, a mechanism that transmits the oil pressure generated through an operation of a brake pedal included in the driving operator 80 to the cylinder via a master cylinder. The brake device 210 is not limited to the configuration described above and may be an electronic control-type hydraulic brake device that controls an actuator in accordance with information input from the second controller 160 and transmits the oil pressure of the master cylinder to the cylinder.

The steering device 220 includes, for example, a steering ECU and an electric motor. The electric motor causes a force to act on a rack-and-pinion mechanism to change an orientation of turning wheels, for example. The steering ECU drives the electric motor in accordance with the information input from the second controller 160 or the information input from the driving operator 80 and changes an orientation of the turning wheels.

[Determination Process]

Figure 3:
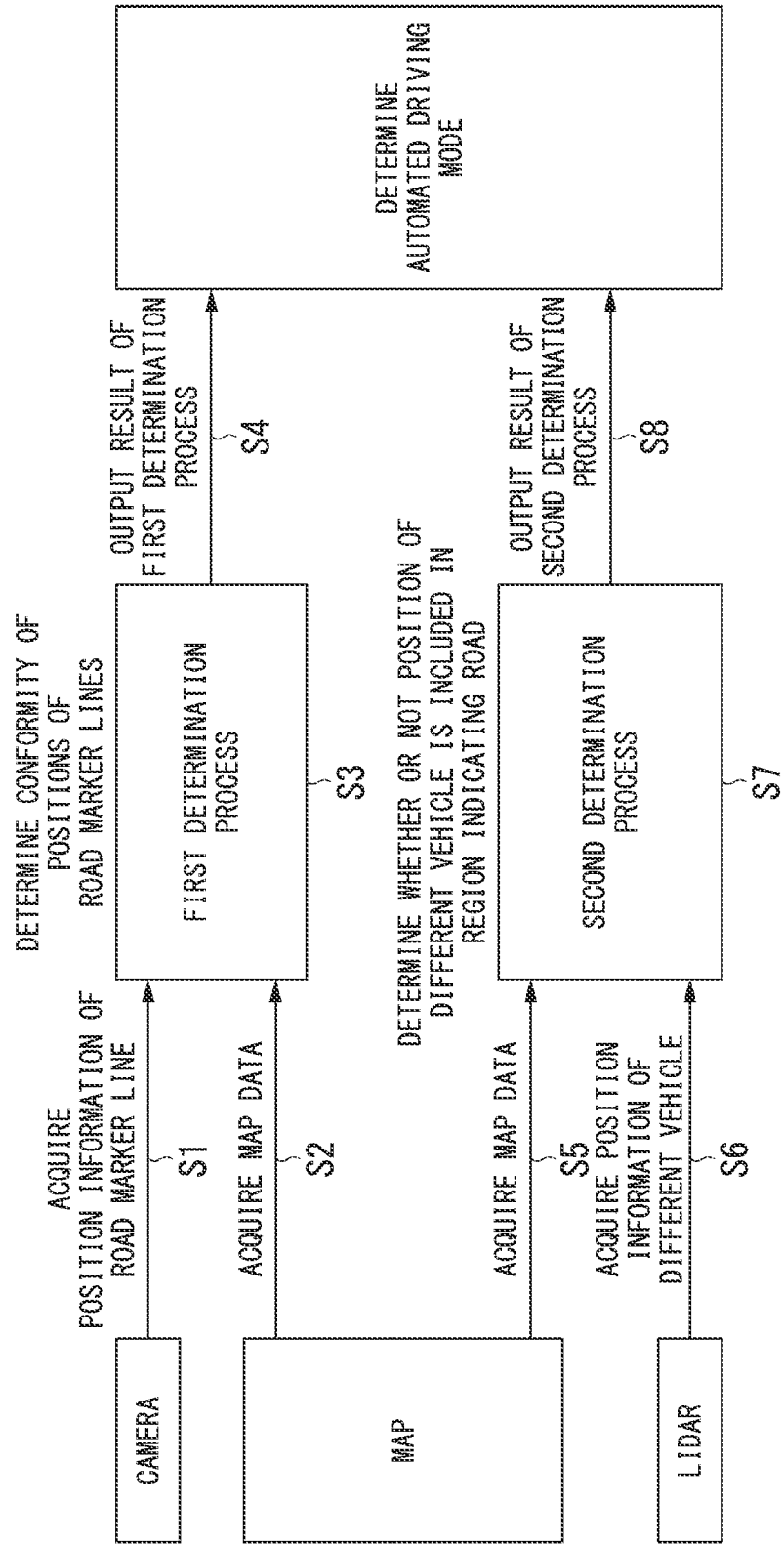
FIG. 3 is a diagram explaining a determination process.

FIG. 3 is a diagram explaining the determination process. The first processor 136 acquires position information (coordinates indicating the position, for example) of a road marker line obtained from an image captured by the camera 10 (S1). Next, the first processor 136 acquires map data included in the second map information 62 (S2). Then, the first processor 136 determines whether or not the position of the road marker line obtained from the image captured by the camera 10 conforms to the position of the road marker line included in the map data (S3) and outputs a determination result (a result of the first determination process) to the action plan generator 140 (S4).

Next, the second processor 138 acquires the map data included in the second map information 62 (S5). Then, the second processor 138 acquires position information of other vehicles obtained from a detection result of the LIDAR 14 (S6). Next, the second processor 138 determines whether or not the positions of other vehicles detected by the LIDAR 14 are included in a region indicating a road included in the map data (S7) and outputs the determination result (a result of the second determination process) to the action plan generator 140 (S8). Then, the action plan generator 140 determines an automated driving mode on the basis of the determination result.

Figure 4:
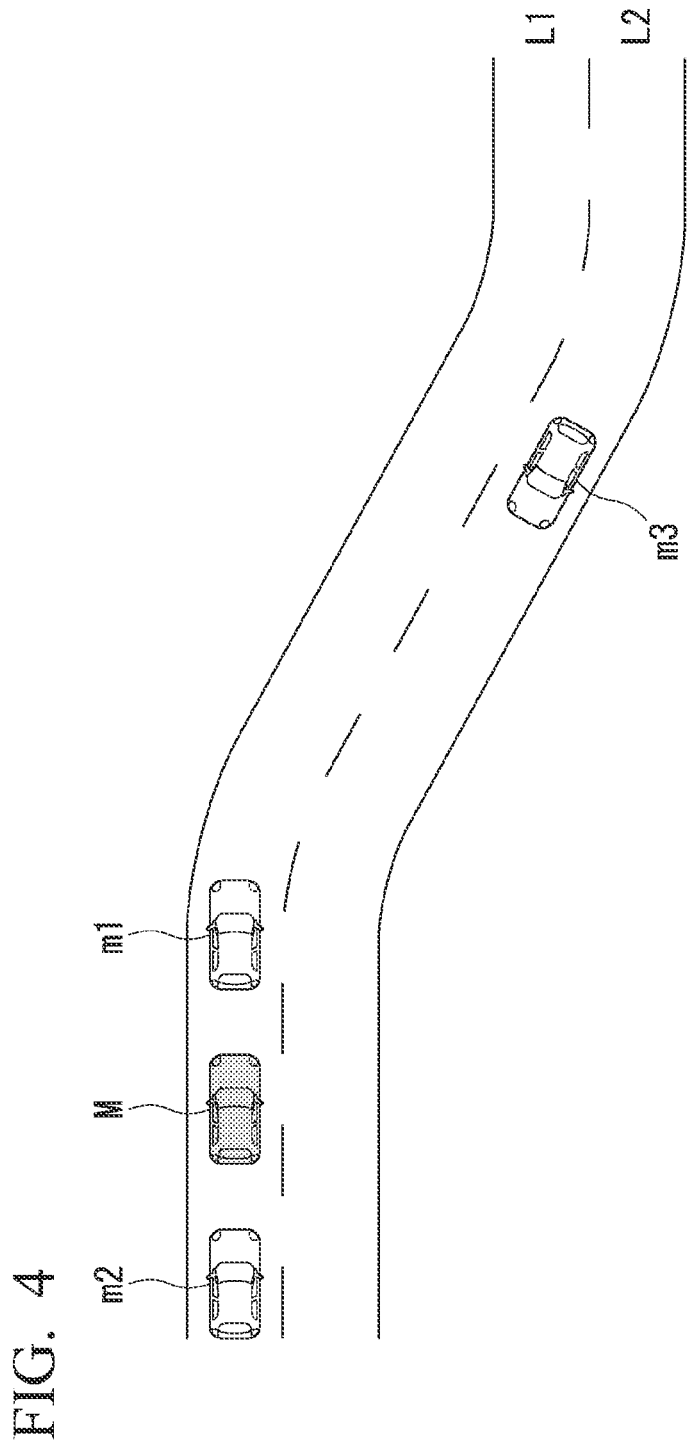
FIG. 4 is a diagram explaining the determination process.

FIG. 4 is a diagram explaining the determination process. The vehicle M is traveling through a lane L1 of a road. A different vehicle m1 is traveling in front of the vehicle M, and a different vehicle m2 is traveling behind the vehicle M. A different vehicle m3 is traveling in front of the vehicle M through a lane L2 that is an opposite lane of the lane L1. At this time, the first processor 136 performs a cross-checking process and determines whether or not the cross-checking has successfully been performed. In a case in which the cross-checking has successfully been performed, that is, in a case in which the position of the vehicle M on the map has been specified, the first processor 136 performs the first determination process.

Figure 5:
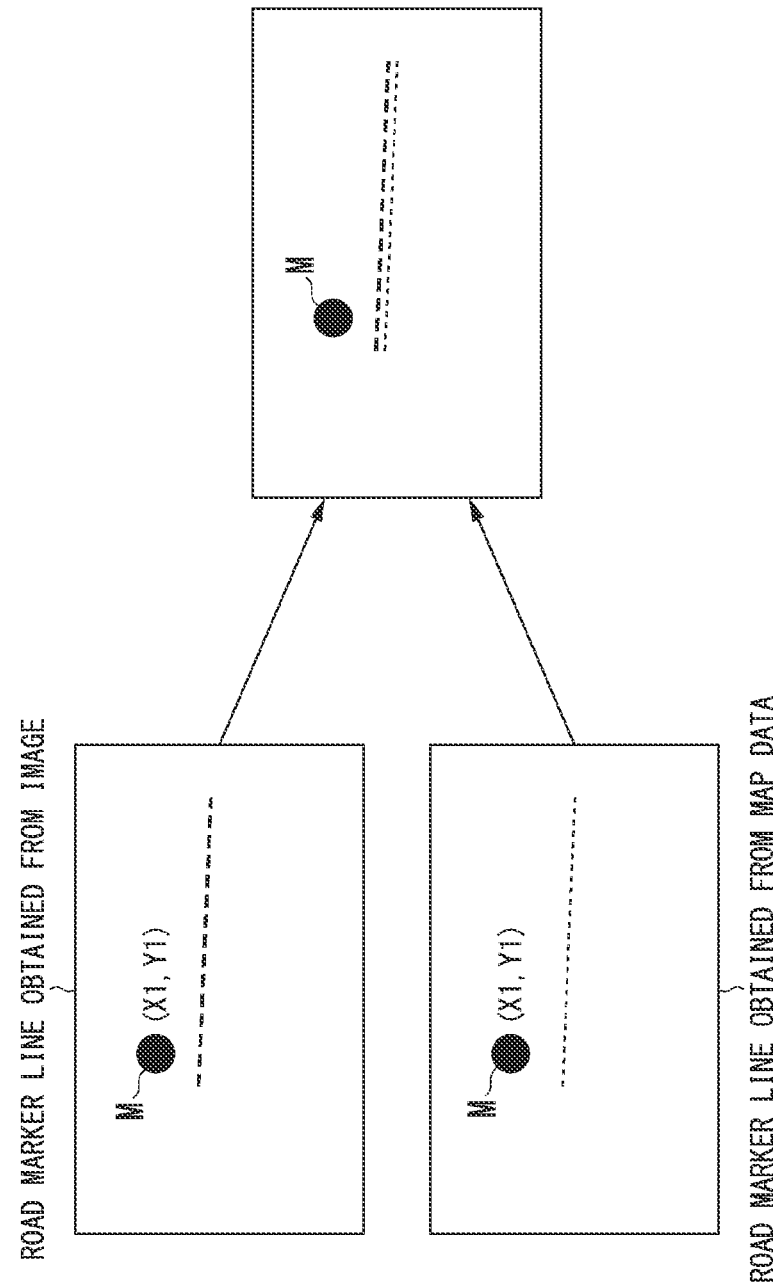
FIG. 5 is a diagram explaining a first determination process.

FIG. 5 is a diagram explaining the first determination process. The first processor 136 recognizes a road marker line in an image plane by extracting edge points with large luminance differences from adjacent pixels in the image and connecting the edge points and converts the position of each of point of the road maker line into a vehicle coordinate system. The first processor 136 superimposes the position of the vehicle M, the position of the road marker line, and the position of the road marker line obtained from the map data on a plane of the vehicle coordinate system and determines whether or not the position of the road marker line conforms to the position of the road marker line obtained from the map data. "Conform" means that a degree of separation between the position of the road marker line obtained from the image and the position of the road marker line obtained from the map data is equal to or less than a threshold value, for example. FIG. 5 shows an example of a case in which it is determined that the positions of the road marker lines conform to each other.

The description will now returned to FIG. 4. The second acquirer 134B acquires the positions of the different vehicles m1 to m3 recognized by the object recognizer 132. The second processor 138 extracts a different vehicle (or a different vehicle located on the frontmost side within a recognizable range) located on the front side of the vehicle M by a predetermined distance from among the different vehicles m1 to m3. In a case in which a plurality of other vehicles are present in front of the vehicle M by the predetermined distance, the second processor 138 extracts a different vehicle that is offset by a predetermined degree in the width direction or a different vehicle that is offset in the highest level with respect to the center axis direction (or the traveling direction) of the vehicle M. In the example in FIG. 4, the different vehicle m3 is extracted as a different vehicle that is a target (second mobile object).

The different vehicle that is a target is suitably a different vehicle that is moving toward the vehicle M in a direction opposite to the direction in which the vehicle M travels. The different vehicle is traveling through the opposite lane and is offset in the width direction with respect to the vehicle M. In a case in which different vehicles are present in front of and behind the vehicle M as in FIG. 4, the recognizer 130 can detect different vehicles that are present in the opposite lane that are present at further positions although the recognizer 130 cannot recognize different vehicles traveling through the traveling lane and located at distant locations. Further, different vehicles that are offset can be more easily detected than different vehicles that are present in front of and behind the vehicle M even in a curved road or the like. Therefore, the second processor 138 can obtain the determination result of the second determination process at an earlier stage by setting the different vehicle m3 as a target.

The road marker line that is a target of the first determination process is a marker line at a first distance from the vehicle M, and the different vehicle that is a target of the second determination process is a different vehicle at a second distance from the vehicle M. The second distance is a distance that is longer than the first distance. The first distance is a distance (several meters, for example) near the vehicle M, and the second distance is a distance from a different vehicle that is distant (several tens of meter to several hundreds of meter) from the vehicle M. In this manner, the automated driving control device 100 can check conformity between the map and the recognition result at the position near the vehicle M and conformity between the map and the recognition result at the position distant from the vehicle M.

Figure 6:
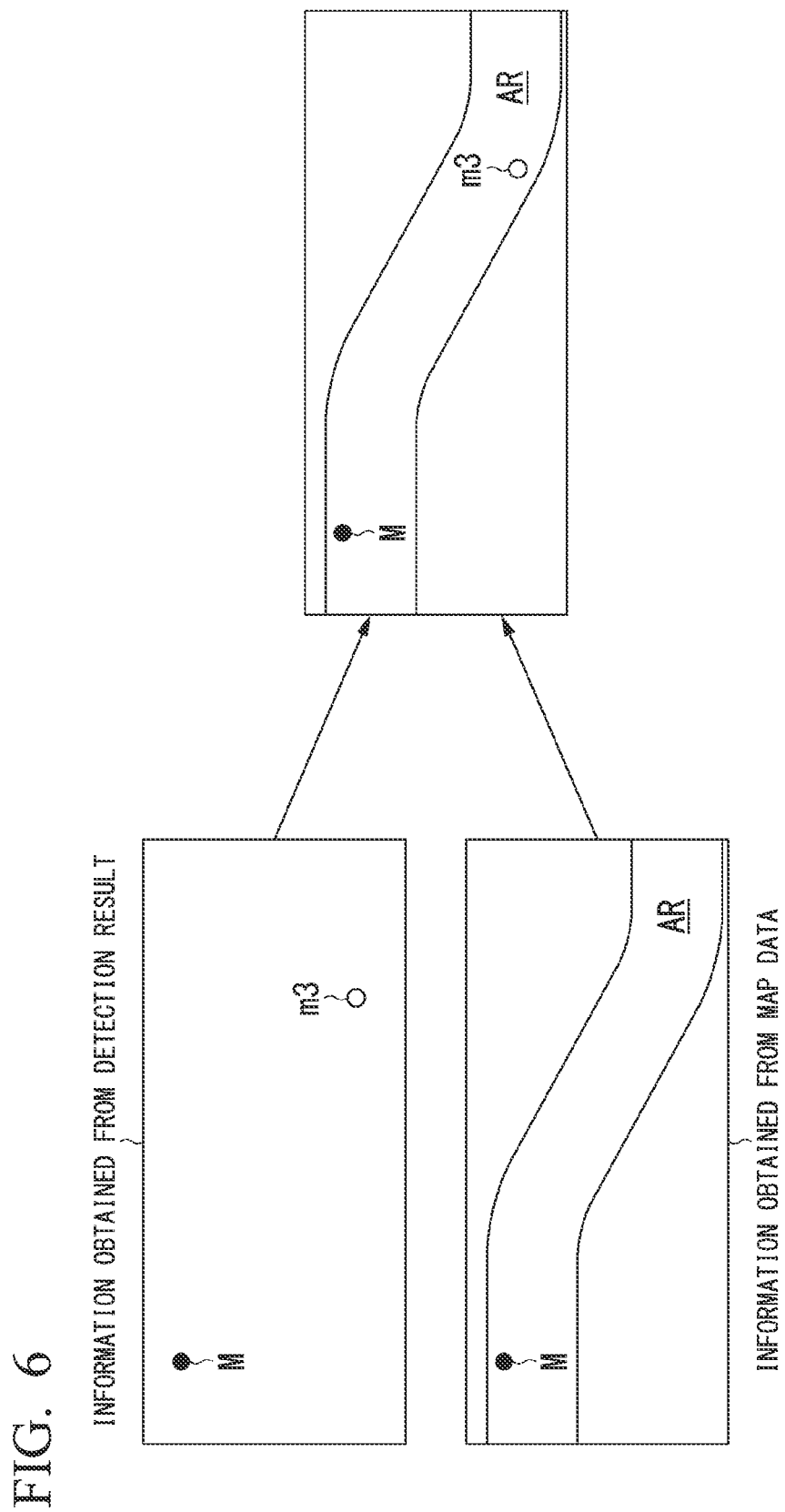
FIG. 6 is a diagram (part 1) explaining a second determination process.

FIG. 6 is a diagram (part 1) explaining the second determination process. The second processor 138 determines whether or not the position of the different vehicle m3 is included in a region AR indicating the road obtained from the map data in a case in which the position of the different vehicle m3 detected by the LIDAR 14 is plotted in the region AR in the vehicle coordinate system. FIG. 6 is an example in which it is determined that the position of the different vehicle m3 is included in the region AR.

In a case in which the second processor 138 determines that the position of the different vehicle m3 is included in the region AR, the different vehicle m3 is traveling through the road corresponding to the map data, and it is thus estimated that the map data has high reliability. On the other hand, in a case in which the second processor 138 determines that the position of the different vehicle m3 is not included in the region AR, the different vehicle m3 is not traveling through the road corresponding to the map data, and it is thus estimated that the map data does not have high reliability. In this case, it is estimated that the shape and the position of the road in the map data and the actually detected shape and position of the road are different from each other because the map data is old or due to a temporary event (such as construction or traffic regulations), for example. In this manner, the recognizer 130 can more precisely evaluate the reliability of the map data using the position of the different vehicle and the map data.

Figure 7:
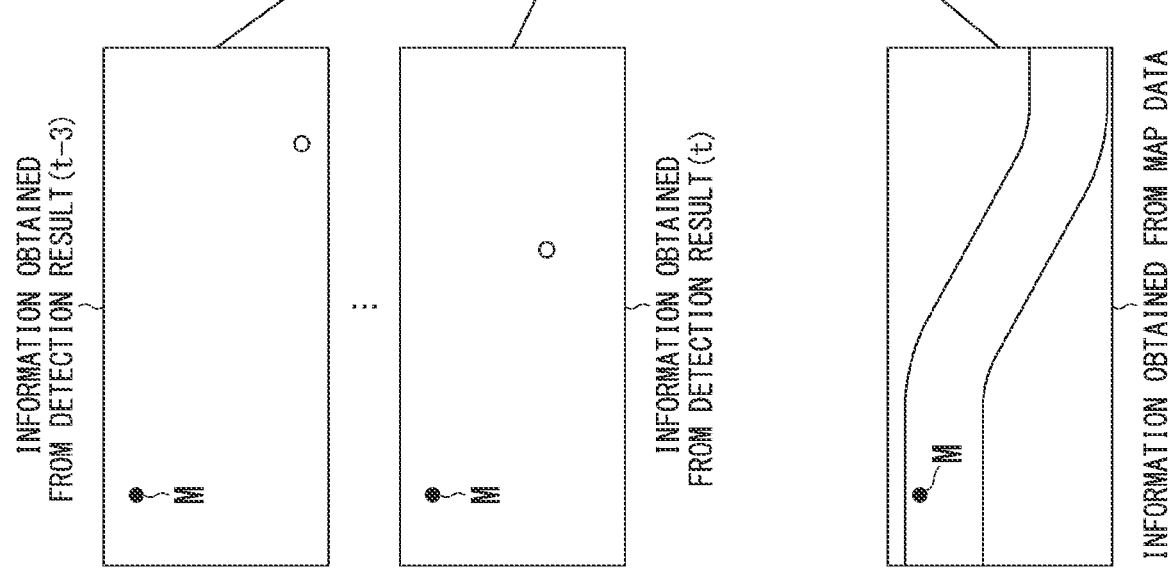
FIG. 7 is a diagram (part 2) explaining the second determination process.

FIG. 7 is a diagram (part 2) explaining the second determination process. The second processor 138 may plot chronological positions of the different vehicle m3 on the map and determine whether or not the position is included in the region indicating the road and the trajectory of the position follows the shape of the road on the map in the second determination process. For example, the fact that the trajectory of the position follows the shape of the road on the map means that a virtual line A conforms to a virtual line B that indicates the shape of the road. The virtual line A is formed by connecting positions at a clock time t-3 to a clock time t aligned in chronological order on the map with a virtual line as shown in FIG. 7 and that indicates a history of the positions.

Figure 8:
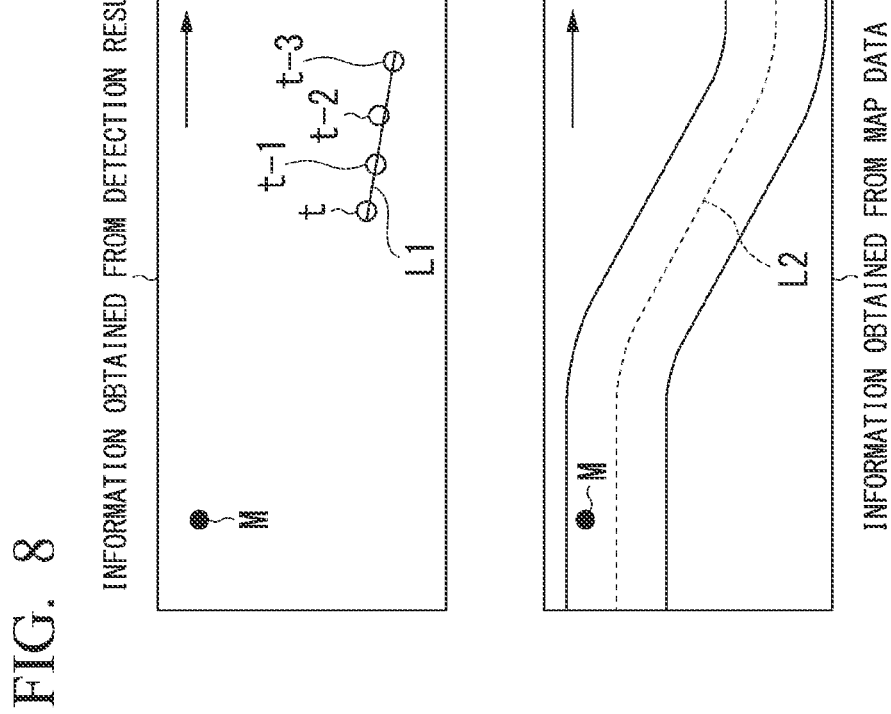
FIG. 8 is a diagram explaining a process of determining whether or not virtual lines conform to each other.

FIG. 8 is a diagram explaining a process of determining whether or not the virtual lines conform to each other. The second processor 138 generates a virtual line L1 connecting the positions at the clock time t-3 to the clock time t and a virtual line L2 indicating the shape of the road. The virtual line L2 is a line corresponding to the center of the road, the road marker line, or an end of the road (edge stone), for example, or a line obtained by extending the virtual line in an extending direction of the road starting from the position where the different vehicle is present (the position at the clock time t-3, for example).

The second processor 138 determines whether or not the trajectory of the position follows the shape of the road on the map on the basis of an angle formed by the virtual line L1 and the virtual line L2 (or the virtual line L2 offset to be superimposed on the virtual line L1). As shown in FIG. 8, the second processor 138 determines that the trajectory of the position does not follow the shape of the road on the map in a case in which the formed angle θ is equal to or greater than a reference angle θs. For example, the second processor 138 determines that the trajectory of the position follows the shape of the road on the map in a case in which the formed angle θ is less than the reference angle θs. In this manner, the recognizer 130 can more precisely evaluate the reliability of the map data using the history of the position of the different vehicle and the map data.

As described above, the recognizer 130 performs the first determination process and the second determination process and evaluates the reliability of the map data. The evaluation result is output to the first controller 120, and the first controller 120 controls the vehicle M on the basis of the evaluation result.

For example, the second processor 138 may determine whether or not the different vehicle is traveling through a correct lane, and in a case in which the different vehicle is traveling through the correct lane, the second processor 138 may determine that the reliability of the map data is high. For example, the second processor 138 specifies the traveling direction of the different vehicle on the basis of the history of the position of the different vehicle. In a case in which the different vehicle is a different vehicle that is approaching the vehicle M, the second processor 138 determines whether or not the position of the different vehicle is included in the opposite lane (or whether or not the history of the position follows the shape of the opposite lane), and in a case in which positive determination is obtained, the second processor 138 determines that the different vehicle is traveling through the correct lane. As described above, the second processor 138 can further improve determination precision by performing the second determination process in consideration of the moving direction of the different vehicle and the type of the lane.

[Automated Driving Mode]

The action plan generator 140 of the first controller 120 executes at least first mode automated driving and second mode automated driving. The first mode automated driving is a mode in which a rate of automation (degree of automation) of automated driving is higher than that of the second mode automated driving. The fact that the rate of automation of automated driving is high means that a degree in which the first controller 120 controls steering or acceleration/deceleration is high (a degree in which the driver is required to intervene the operation of steering or acceleration/deceleration is low). The first mode automated driving is a mode in which duties of the driver (tasks that the driver is required to perform, required behaviors) are smaller than that in the second mode automated driving. The rate of automation of automated driving links to a surroundings monitoring state or a steering gripping state, for example.

FIG. 9 is a diagram explaining an example of the first mode automated driving and the second mode automated driving. The first mode automated driving is a mode that is executed under a condition that the driver is monitoring at least the surroundings. The second mode automated driving is a mode executed under a condition that the driver is monitoring at least the surroundings and in a hands-on state.

FIG. 10 is a diagram explaining another example of the first mode automated driving and the second mode automated driving. The first mode automated driving may be a mode that does not require the driver to monitor the surroundings and is executed even if the driver is not in the hands-on state. The second mode automated driving may be a mode executed under a condition that the driver monitors at least the surroundings.

The second mode automated driving may be a mode in which a degree of a surroundings monitoring duty that the driver of the vehicle M is required to have is higher as compared with a case in which the first mode automated driving is performed. For example, the first mode automated driving and the second mode automated driving may be modes in which the surroundings monitoring duty is required, and the second mode automated driving may be a mode in which a degree of the surroundings monitoring duty that the driver of the vehicle M is required to have is higher (a mode in which it is more necessary for the driver to monitor the surroundings) as compared with the case in which the first mode automated driving is performed. The mode in which it is more necessary for the driver to monitor the surroundings means that a frequency of the monitoring has to be higher or display of an image or a video that is not related with the traveling and the driving of the vehicle M on a display of the vehicle M is limited.

[Utilization of Evaluation Result]

The action plan generator 140 determines whether to start the first mode automated driving, whether to end the first mode automated driving, or whether to start the second mode automated driving on the basis of the result of the determination process.

FIG. 11 is a diagram explaining a relationship between a start or an end of the automated driving mode and a result of the determination process. The condition of the start of the first mode is that at least the result of the first determination process is positive. In the condition of the start of the first mode, the result of the second determination process may be positive or may not be taken into consideration.

The condition of the end of the first mode is that at least the result of the second determination process is negative. In the condition of the end of the first mode, the result of the first determination process may not be taken into consideration.

The condition of the start of the second mode is that at least the result of the first determination process is positive. In the condition of the start of the second mode, the result of the first determination process or the result of the second determination process may not be taken into consideration.

As described above, in a case in which the result of the second determination process is negative in a state in which the first mode automated driving is being performed, the first mode automated driving is not continued, and the state of the automated driving moves on to the second mode automated driving.

[Flowchart (Part 1)]

Figure 12:
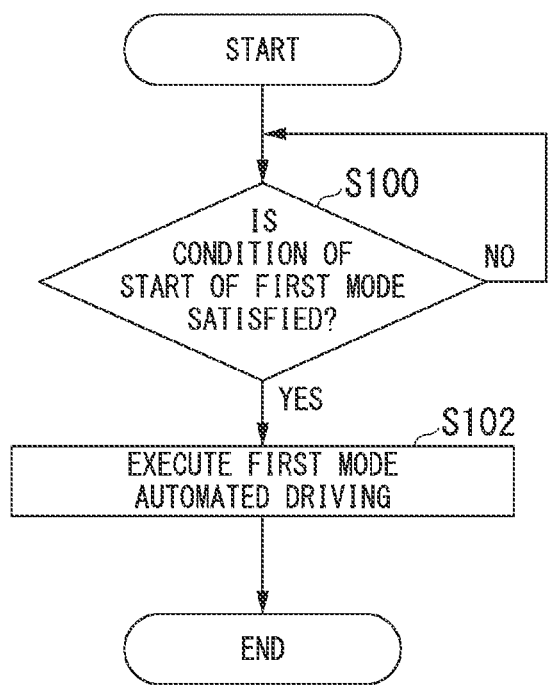
FIG. 12 is a flowchart showing an example of a flow of a process executed by an action plan generator.

FIG. 12 is a flowchart showing an example of a flow of a process executed by the action plan generator 140. First, the action plan generator 140 determines whether or not the condition of the start of the first mode automated driving is satisfied (Step S100). In a case in which the condition of the start of the first mode automated driving is satisfied, the action plan generator 140 executes the first mode automated driving (Step S102). In this manner, the process of one routine in the flowchart is ended.

[Flowchart (Part 2)]

Figure 13:
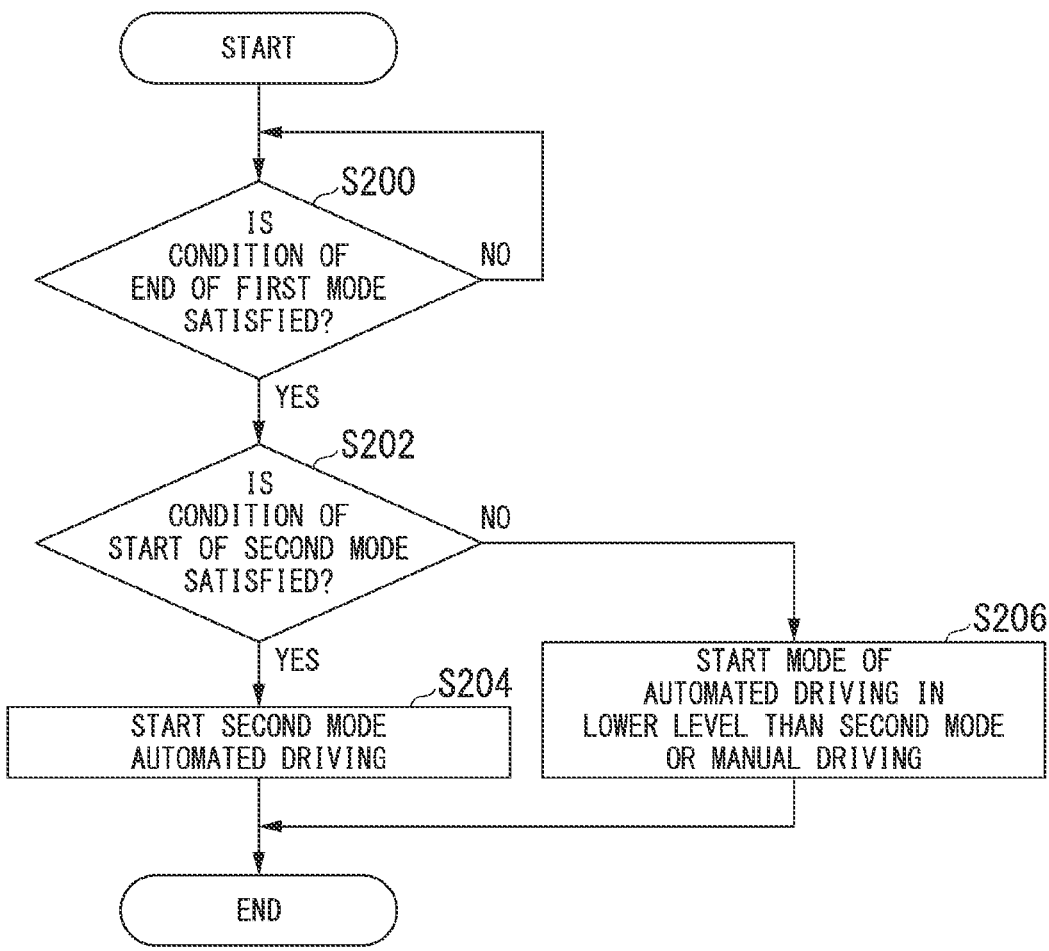
FIG. 13 is a flowchart showing an example of a flow of a process executed by the action plan generator.

FIG. 13 is a flowchart showing an example of a flow of a process executed by the action plan generator 140. For example, the flowchart is started after the process in the flowchart in FIG. 12 is ended. First, the action plan generator 140 determines whether or not the condition of the end of the first mode automated driving is satisfied (Step S200). In a case in which the condition of the end of the first mode automated driving is satisfied, the action plan generator 140 determines whether or not the condition of the start of the second mode automated driving is satisfied (Step S202).

In a case in which the condition of the start of the second mode automated driving is satisfied, the action plan generator 140 starts the second mode automated driving (Step S204). In a case in which the condition of the start of the second mode automated driving is not satisfied, the action plan generator 140 executes a process of starting an automated driving mode (or driving assistance) in which a degree of automated driving is lower than that of the second mode automated driving or of moving on to manual driving from the automated driving (Step S206). The driving assistance is assistance, representative of which includes an adaptive cruise control system (ACC) for traveling with a distance between a vehicle traveling ahead and the vehicle M maintained at a predetermined distance and a lane keeping assist system (LKAS) that causes the vehicle M to travel with the distance between the road marker line of the lane through which the vehicle M travels and the vehicle M constantly maintained.

In this manner, the automated driving control device 100 controls the automated driving mode on the basis of the result of the determination process. For example, since the reliability of the map data is more precisely evaluated as described above, the automated driving control device 100 can realize control in further consideration of the reliability level of information regarding the situation of the surroundings of the vehicle M that is held by the automated driving control device 100. In this manner, the reliability of automated driving control is improved.

For example, although it is possible to determine the reliability of the map data using the positions of terrestrial features in the surroundings of the road, the positions of terrestrial features of the road, and the map data, the reliability is more precisely determined in a case in which the reliability of the map data is determined using the position of the mobile object that is actually traveling on the road and the map data as compared with the stationary terrestrial features. Further, the reliability of the map data is more precisely determined using the mobile object even in a case in which there are no terrestrial features (for example, a road located in a rice field) in the surroundings of the aforementioned road and the like.

Further, the recognizer 130 can determine the reliability level of the map data of a further location by employing the mobile object that is a three-dimensional object as in the present embodiment as a determination target instead of employing a non-three-dimensional target such as a road marker line as a determination target. Since the reliability level of the map data at the further location can be determined, the automated driving control device 100 can more quickly perform control related to automated driving. In a case in which it is determined that the reliability level of map data on the front side by a predetermined distance is low, for example, the automated driving control device 100 can perform a process of switching the automated driving to the second mode automated driving (a process of providing a notification to perform surroundings monitoring or hands-on to the passenger) at an earlier stage. In this manner, the passenger can prepare for the mode switching with enough time.

As described above, according to the present embodiment, the reliability level of the automated driving is improved by the recognizer 130 more precisely determining the reliability of the map data and by the action plan generator 140 performing the control related to the automated driving on the basis of the determined reliability level of the map data.

Figure 14:
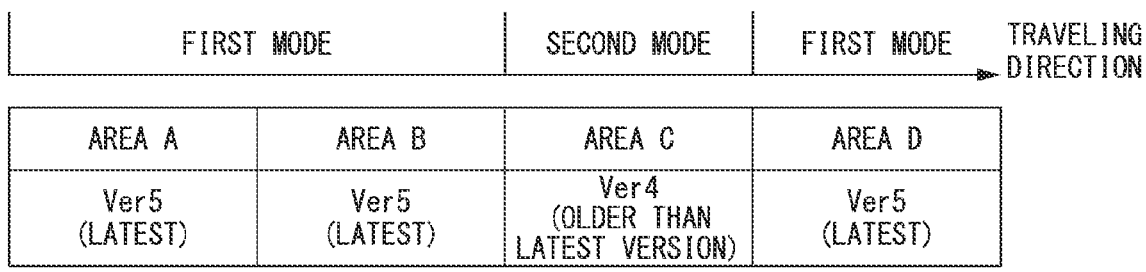

FIG. 14 is a diagram explaining an example in which automated driving modes are switched. For example, the map data held by the vehicle M may be the latest for some areas or may be of an older version than the latest version. For example, it is assumed that map data in an area A, an area B, and an area D is the latest while map data in an area C is of an older version than the latest version. It is also assumed that the map data in the area C is different from an actual road shape in the area C.

For example, the vehicle M executes the first mode automated driving in the area A and the area B, and the second determination result is negative immediately before the vehicle M enters the area C (or after the vehicle M enters the area C). In this case, since the condition to execute the first mode automated driving is not satisfied any more, the vehicle M shifts the first mode automated driving to the second mode automated driving. Next, if the results of the first determination process and the second determination process become positive immediately before the vehicle M enters an area D (or after the vehicle M enters the area D), and the condition to execute the first mode automated driving is satisfied, then the vehicle M executes the first mode automated driving.

In this manner, the vehicle M performs automated driving with high reliability on the basis of the surrounding situation and the information that the vehicle M itself holds.

Although the example of the map data of an old version has been described in the aforementioned example, the result of the first determination process may be negative due to construction or traffic regulations even if the map data is the latest, for example. The first mode automated driving is ended as described above in such a case as well.

The second determination process may be stopped in a case in which the result of the second determination process is negative in a first road link, and the second determination process may be restarted in a case in which the vehicle M has approached the next adjacent road link. In a case in which the result of the second determination process is negative, and the second determination process is stopped, the second determination process may be restarted after a predetermined time elapses from the timing when the result of the second determination process becomes negative or after the vehicle M travels by a predetermined distance. For example, in a case in which it is determined that the position of the second mobile object is not included in the region indicating the road of the road information when the first mode automated driving is preformed, the automated driving control device 100 stops the process of determining whether or not the position of the second mobile object is included in the region indicating the road of the road information and restarts the determination at a "predetermined timing" after the determination is stopped. The "predetermined timing" is, for example, a "timing at which the vehicle M has approached the next road link", a "timing at which a predetermined time has elapsed from a timing at which the second determination process is stopped or a timing at which the vehicle M has traveled by a predetermined distance", or a "timing at which the first mode automated driving has been restarted". The automated driving control device 100 stops the first mode automated driving in a case in which the result of the second determination process is negative. The condition under which the automated driving control device 100 restarts the first mode automated driving is that one or both of the determination results of the first determination process and the second determination process are positive, for example. Through these processes, an unnecessary process is reduced, and the second determination process is performed at an appropriate timing. Moreover, the first mode automated driving is restarted at a more appropriate timing.

According to the embodiment described above, the recognizer 130 can more precisely evaluate the reliability of the map data by cross-checking the position of the second mobile object included in the detection result with the road information of the map data and determining whether or not the position of the second mobile object is included in the region indicating the road of the road information. Moreover, the automated driving control device 100 can perform automated driving with higher reliability using the result of evaluating the map data with higher reliability.

Figure 15:
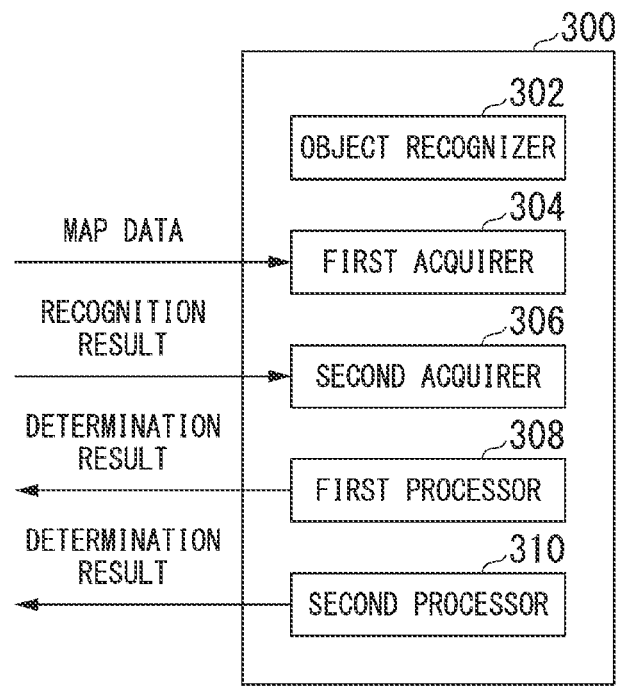
FIG. 15 is a diagram showing an example of a functional configuration of the processing device.

Although the above embodiment has been described on the assumption that the first acquirer 134A, the second acquirer 134B, the first processor 136, and the second processor 138 are included in the automated driving control device 100, functional sections that have functions similar to those of these functional sections may be included in a processing device 300 instead as shown in FIG. 15. The processing device 300 is a member separate from the automated driving control device 100. The processing device 300 includes an object recognizer 302, a first acquirer 304, a second acquirer 306, a first processor 308, and a second processor 310. The object recognizer 302, the first acquirer 304, the second acquirer 306, the first processor 308, and the second processor 310 have functions equivalent to those of the first acquirer 134A, the second acquirer 134B, the first processor 136, and the second processor 138, respectively. In this case, the first acquirer 304 acquires map data from another device or the like, and the second acquirer 306 acquires a detection result from another device or the like (a detection result of a camera, a radar device, a LIDAR, or the like). The automated driving control device 100 acquires the determination result from the processing device 300 and executes control on the basis of the acquired determination result.

[Hardware Configuration]

Figure 16:
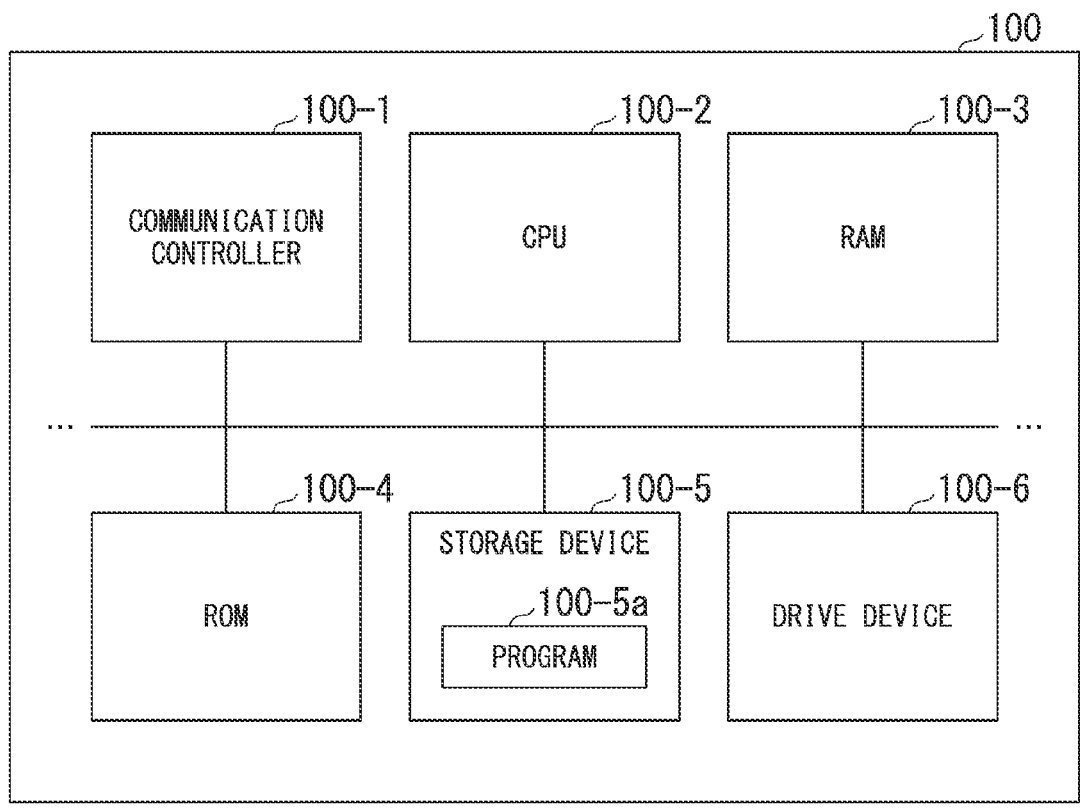
FIG. 16 is a diagram showing an example of a hardware configuration of an automated driving control device according to the embodiment.

FIG. 16 is a diagram showing an example of a hardware configuration of the automated driving control device 100 according to the embodiment. As shown, the automated driving control device 100 is configured such that a communication controller 100-1, a CPU 100-2, a random-access memory (RAM) 100-3 used as a working memory, a read-only memory (ROM) 100-4 that stores a boot program and the like, a storage device 100-5 such as a flash memory or a hard disk drive (HDD), a drive device 100-6, and the like are connected to each other via an internal bus or a dedicated communication line. The communication controller 100-1 performs communication with components other than the automated driving control device 100. The storage device 100-5 stores a program 100-5a that the CPU 100-2 is to execute. The program is developed on the RAM 100-3 by a direct memory access (DMA) controller (not shown) or the like and is executed by the CPU 100-2. In this manner, some or all of the first controller 120, the second controller 160, and functional sections included therein are realized.

The aforementioned embodiment can be expressed as follows.

A processing device including:
a memory that stores instructions, and
one or more processors that execute the instructions to:
acquire map data that has road information,
acquire detection results detected by one or more detection sections adapted to detect surroundings of a first mobile object, and
cross-check a position of a second mobile object included in the detection results with the road information of the map data to determine whether or not the position of the second mobile object is included in a region indicating a road of the road information.

Although a form for implementing the disclosure has been described using the embodiment, the disclosure is not limited to such an embodiment, and various modifications and replacements can be added without departing from the gist of the disclosure.

What is claimed is:

1. A processing device comprising:
a memory that stores instructions, and
one or more processors that execute the instructions to:
acquire map data that has road information,
acquire detection results detected by one or more detectors that detects surroundings of a first mobile object,
control a speed and steering of the first mobile object to perform automated driving,
cross-check a position of a second mobile object included in the detection results with the road information of the map data to determine whether or not the position of the second mobile object is included in a region indicating a road of the road information,
determine the map data has high reliability in a case in which it is determined that the position of the second mobile object is included in the region indicating the road of the road information,
determine the map data has low reliability in a case in which it is determined that the position of the second mobile object is not included in the region indicating the road of the road information,
execute first mode automated driving in a case in which the map data has high reliability, and
stop the first mode automated driving or execute second mode automated driving in a case in which the map data has low reliability, and
the second mode automated driving being automated driving in a mode in which a rate of automation of the automated driving is lower than a rate of automation of the first mode automated driving or a degree of surroundings monitoring required to a driver of the first mobile object is higher than a degree of surroundings monitoring as compared with a case in which the first mode automated driving is performed.

2. The processing device according to claim 1, wherein the one or more processors execute the instructions to: determine whether or not a chronological trajectory of the position of the second mobile object is included in the region indicating the road and follows a shape of the road.

3. The processing device according to claim 1, wherein the second mobile object is a mobile object that is moving toward the first mobile object in a direction opposite to a traveling direction of the first mobile object.

4. The processing device according to claim 1,
wherein the one or more processors execute the instructions to:
continue the first mode automated driving in a case in which it is determined that the position of the second mobile object is included in the region indicating the road of the road information when the first mode automated driving is performed, and do not continue the first mode automated driving in a case in which it is determined that the position of the second mobile object is not included in the region indicating the road of the road information when the first mode automated driving is performed.

5. The processing device according to claim 4, wherein the one or more processors execute the instructions to:
perform the second mode automated driving in a case in which it is determined that the position of the second mobile object is not included in the region indicating the road of the road information when the first mode automated driving is performed.

6. The processing device according to claim 4, wherein the one or more processors that execute the instructions to:
stop the process of determining whether or not the position of the second mobile object is included in the region indicating the road of the road information in a case in which it is determined that the position of the second mobile object is not included in the region indicating the road of the road information when the first mode automated driving is performed, and
restart the determination at a predetermined timing after the determination is stopped.

7. The processing device according to claim 1, wherein the one or more processors execute the instructions to:
determine whether or not a position of a road marker line included in the detection results conforms to a position of a road marker line included in the road information.

8. The processing device according to claim 7, wherein the one or more processors execute the instructions to:
start the first mode automated driving in a case in which a condition (1) of conditions (1) and (2) below is satisfied or conditions (1) and (2) are satisfied,
the condition (1) being that a position of a road marker line included in the road information conforms to a position of a road marker line included in the detection result, and
the condition (2) being that the position of the second mobile object included in the detection results is included in the region indicating the road of the road information.

9. The processing device according to claim 1, wherein the one or more processors execute the instructions to:
stop the first mode automated driving or shift from the first mode automated driving to the second mode automated driving in a case in which a condition (3) below is satisfied when the first mode automated driving is performed,
the condition (3) being that the position of the second mobile object included in the detection results is not included in the region indicating the road of the road information.

10. The processing device according to claim 1, wherein the one or more processors execute the instructions to:
control the speed and the steering of the first mobile object to perform automated driving based on a result of determining whether or not the position of the second mobile object is included in the region indicating the road of the road information.

11. A processing method for a computer, comprising:
acquiring map data that has road information;
acquiring detection results detected by one or more detectors that detects surroundings of a first mobile object;
controlling a speed and steering of the first mobile object to perform automated driving;
cross-checking a position of a second mobile object included in the detection results with the road information of the map data and determining whether or not the position of the second mobile object is included in a region indicating a road of the road information;
determining the map data has high reliability in a case in which it is determined that the position of the second mobile object is included in the region indicating the road of the road information,
determining the map data has low reliability in a case in which it is determined that the position of the second mobile object is not included in the region indicating the road of the road information,
executing first mode automated driving in a case in which the map data has high reliability, and
stopping the first mode automated driving or execute second mode automated driving in a case in which the map data has low reliability, and
the second mode automated driving being automated driving in a mode in which a rate of automation of the automated driving is lower than a rate of automation of the first mode automated driving or a degree of surroundings monitoring required to a driver of the first mobile object is higher than a degree of surroundings monitoring as compared with a case in which the first mode automated driving is performed.

12. A non-transitory computer storage medium storing a program causing a computer to execute:
acquire map data that has road information;
acquire detection results detected by one or more detectors that detects surroundings of a first mobile object;
control a speed and steering of the first mobile object to perform automated driving;
cross-check a position of a second mobile object included in the detection results with the road information of the map data to determine whether or not the position of the second mobile object is included in a region indicating a road of the road information;
determine the map data has high reliability in a case in which it is determined that the position of the second mobile object is included in the region indicating the road of the road information,
determine the map data has low reliability in a case in which it is determined that the position of the second mobile object is not included in the region indicating the road of the road information,
execute first mode automated driving in a case in which the map data has high reliability, and
stop the first mode automated driving or execute second mode automated driving in a case in which the map data has low reliability, and
the second mode automated driving being automated driving in a mode in which a rate of automation of the automated driving is lower than a rate of automation of the first mode automated driving or a degree of surroundings monitoring required to a driver of the first mobile object is higher than a degree of surroundings monitoring as compared with a case in which the first mode automated driving is performed.

* * * * *